United States Patent
Blonskey et al.

(10) Patent No.: US 12,339,649 B2
(45) Date of Patent: Jun. 24, 2025

(54) INDUSTRIAL WIRELESS COMMUNICATION NETWORKING DEVICE

(71) Applicant: CoreTigo Ltd., Netanya (IL)

(72) Inventors: Ofer Blonskey, Even Yehoda (IL);
Omer Ephrat, Ramat Gan (IL);
Lóránd Molnár, Szeged (HU)

(73) Assignee: CoreTigo Ltd., Netanya (IL)

( * ) Notice: Subject to any disclaimer, the term of this patent is extended or adjusted under 35 U.S.C. 154(b) by 0 days.

(21) Appl. No.: 17/663,753

(22) Filed: May 17, 2022

(65) Prior Publication Data

US 2023/0376016 A1 Nov. 23, 2023

(51) Int. Cl.
G05B 19/418 (2006.01)

(52) U.S. Cl.
CPC ..... *G05B 19/4186* (2013.01); *G05B 19/4183* (2013.01); *G05B 19/41855* (2013.01)

(58) Field of Classification Search
CPC .............................. H04L 67/12; G05B 19/4186
See application file for complete search history.

(56) References Cited

U.S. PATENT DOCUMENTS

| | | | | |
|---|---|---|---|---|
| 2007/0163773 | A1* | 7/2007 | Webb | F24F 11/62 165/254 |
| 2015/0121507 | A1* | 4/2015 | Haija | G06F 21/44 726/17 |
| 2019/0327662 | A1* | 10/2019 | Franz | H04W 84/20 |
| 2019/0386860 | A1* | 12/2019 | Blonskey | H04L 27/14 |
| 2020/0278943 | A1* | 9/2020 | Schäfer | G06F 13/4068 |

FOREIGN PATENT DOCUMENTS

WO WO-2019130231 A1 * 7/2019 ............... H04B 3/00

* cited by examiner

*Primary Examiner* — Jason D Recek
(74) *Attorney, Agent, or Firm* — M&B IP Analysts, LLC

(57) ABSTRACT

An industrial mission critical networking communication device is adapted from a wired industrial networking communication device to provide wireless capabilities. Accordingly, the PHY of the wired device, that is communicatively connected to a first microcontrollers, is replaced by a second microcontroller. The second microcontroller is adapted to communicate with the first microcontroller using a serial adaptation layer to ensure that the original communication interface between the PHY and the first microcontroller is maintained. The second microcontroller is further adapted with at least capabilities of wireless communication to allow for wireless communication based on a predetermined protocol, for example, the wireless IO-Link® protocol.

8 Claims, 5 Drawing Sheets

INDUSTRIAL WIRELESS COMMUNICATION NETWORKING DEVICE

TECHNICAL FIELD

The present disclosure relates generally to industrial networking components, and, more particularly, to a wireless adaptor of a wired industrial networking component.

BACKGROUND

Industrial systems include a variety of components, including a multitude of sensors and actuators, that are implemented to execute various automated tasks in order to produce a desired product or carry out a specific process. Each individual industrial component is typically controlled, e.g., an actuator is instructed to move a robotic arm in a particular manner, or communicated with, e.g., a sensor value reading is received to adjust a process accordingly. To communicate back and forth over a network it is necessary to provide such components of the industrial system with means of communications, also referred to as mission critical communication link. One such mean of communication is known by the name IO-Link® which is a short distance, bidirectional communication link intended for use in the industrial environment.

The original IO-Link standard (also known as IEC 61131-9) was designed to allow for wired communication between sensors and actuators. This later evolved also to a wireless component, the IO-Link wireless, which is an extension to the IO-Link at the physical level. The IO-link protocol defines a component called the W-Bridge, which is a separate piece of hardware, sold separately and that when connected to an otherwise wired IO-Link component, e.g., a sensor, the IO-Link device in combination with the W-Bridge become a wireless device.

FIG. 1A is an example IO-Link sensor 100A which is a wired IO-Link sensor. A sensor 112 is adapted to sense the environment and may be, for example and without limitations, designed to sense temperature, humidity, pressure, vibration, acceleration, illumination, noise, audio, and other physical signals. A body 114 houses therein the sensor 112 and any electronic or other components necessary for transferring the physical signal sensed to digital data that is transmitted over a wire 116. The transmission is provided using, for example, the IO-Link protocol. FIG. 100B is an example where a wired sensor, for example wired sensor 100A is connected to a W-bridge 118 via a wired link 116. The W-Bridge 118 is equipped with an antenna 119 that is designed to receive and transmit signals wirelessly according to the wireless protocol of IO-Link. The combination of the W-Bridge 118 and the wired sensor 110A provides a solution for a wireless component, all be it at a cost due to the inefficient solution.

FIG. 1C is an example block diagram of a circuitry 120 of a wired IO-Link sensor. The core of the circuitry 120 is a microcontroller unit (MCU) 122 which typically comprises components such as a processing element (PE) (not shown), a memory (not shown) and various other hardware devices as may be required for the performance of the tasks controlled by the MCU 122. For example, a sensor or actuator logic 125 may be included as part of the MCU 122 that provides the necessary interface between the MCU 122 and the sensor/actuator hardware 126. This is necessary to provide commands to the sensor/actuator and received data, for example, data regarding samples of measured physical signals. Instructions stored in the memory of MCU 122 may be executed by the MCU 122 PE so as to perform the MCU 122 tasks described herein.

The MCU 122 may further comprise an IO-Link (IOL) device 124 component that provides for the necessary portions of the implementation of the IO-Link protocol. The MCU 122 further executes a PHY drive 123 that provides over a communication link 128 the PHY interface, the PHY denoting the physical communication layer of the network schema. A PHY component 121 is communicatively connected to the PHY interface 128 to receive and provide data from and to the MCU 122. The PHY component 121 is further communicatively connected to the wired network interface, for example IO-Link PHY, to receive and transmit data using, for example, the IO-Link protocol. Power is supplied to the MCU 122 by a voltage converter 127, for example but not by way of limitation, where a voltage converter converts the 24 volts provided over network interface 116 to, for example, a 3.3 volt used by the MCU 122.

It would be desirable to provide a solution for an industrial wireless communication networking device operative within the framework of the wireless IO-Link that overcomes the deficiency of the inefficient solution of the prior art. Furthermore, it would be advantageous to make reuse of components such as the MCU as for a manufacturer of an industrial wireless communication networking device this is a component that has been already heavily invested in.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Some example embodiments disclosed herein include an industrial mission critical wireless network communication device, comprising: a second microcontroller communicatively connected to the first microcontroller using the physical layer communication protocol, the second microcontroller adapted with a serial adaptation layer to adapt communication of the physical layer to a wireless communication protocol, and being further adapted to control wireless communication according to a predetermined wireless communication protocol; and, a power convertor connected to the first microcontroller and the second microcontroller providing an operation voltage thereto that is lower than the voltage provided to the power convertor.

Some example embodiments disclosed herein also include an industrial mission critical wireless network communication device, comprising: a second microcontroller communicatively connected to the first microcontroller using the physical layer communication protocol, the second microcontroller adapted with a serial adaptation layer to adapt communication of the physical layer to a wireless communication protocol, and being further adapted to control wireless communication according to a predetermined wireless communication protocol; and, a power convertor connected to the first microcontroller and the second microcontroller providing an operation voltage thereto that is lower than the voltage provided to the power convertor, wherein the wireless industrial network communication device is operative according to the IO-Link® protocol.

Some example embodiments disclosed herein also include an industrial mission critical wireless network communication device, comprising: a second microcontroller communicatively connected to the first microcontroller using the physical layer communication protocol, the second microcontroller adapted with a serial adaptation layer to adapt communication of the physical layer to a wireless communication protocol, and being further adapted to control wireless communication according to a predetermined wireless communication protocol; a power convertor connected to the first microcontroller and the second microcontroller providing an operation voltage thereto that is lower than the voltage provided to the power convertor; and, a physical layer component for wired communication, the physical later component communicatively connected to the first microcontroller.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
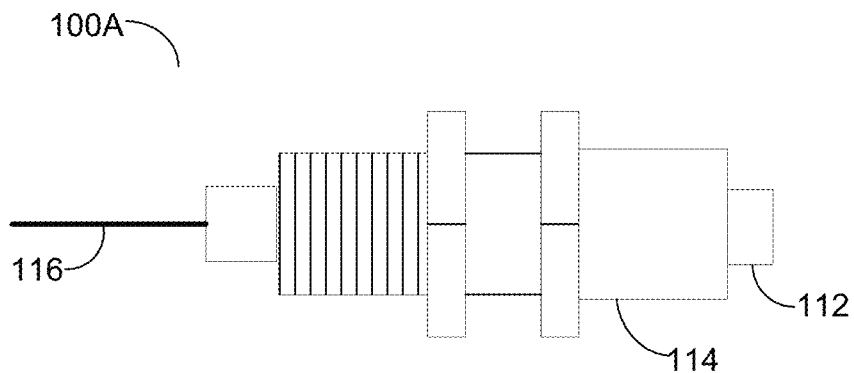
FIG. 1A a diagram of a wired IO-Link sensor.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 1B:
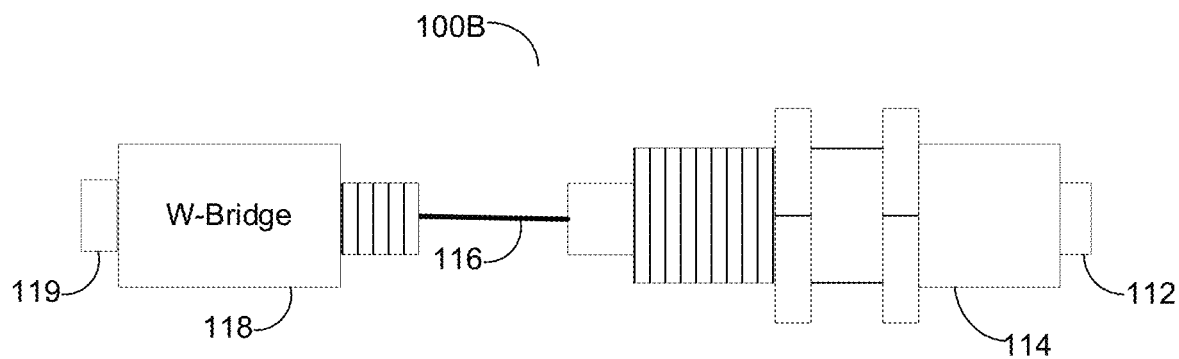
FIG. 1B is a diagram of a wired IO-Link sensor communicatively connected to a W-Bridge to create together a wireless IO-Link sensor.
Figure 1C:
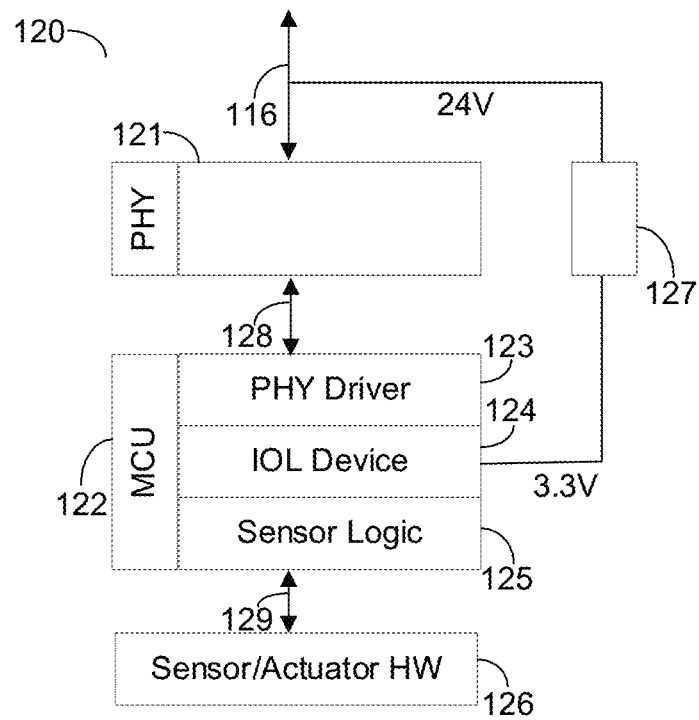
FIG. 1C is a block diagram of a circuitry of a wired IO-Link sensor.

The use of two components, a wired IO-Link device, for example the one described in FIG. 1A in conjunction with a W-Bridge 118 described in FIG. 1B, is a costly and cumbersome contraption involving two separate components that have to be connected via a wire. This increases the chance of in-field failures and is susceptible to all kinds of failures. Therefore, there is a need to overcome these shortcomings of the prior art. It is suggested herein that by replacing of the PHY component 121 of the wired IO-Link device by an appropriate wireless component that would be embedded within the body of the wired IO-Link sensor, it is possible to overcome the deficiencies of the prior art.

Therefore, a mission critical industrial networking communication device is adapted from a wired industrial networking communication device to provide wireless capabilities. Accordingly, the PHY of the wired device, that is communicatively connected to a first microcontrollers, is replaced by a second microcontroller. The second microcontroller is adapted to communicate with the first microcontroller using a serial adaptation layer to ensure that the original communication interface between the PHY and the first microcontroller is maintained. The second microcontroller is further adapted to perform mission critical wireless communication, such as but not limited to, those performed by the like of a wireless IO-Link® protocol.

Figure 2:
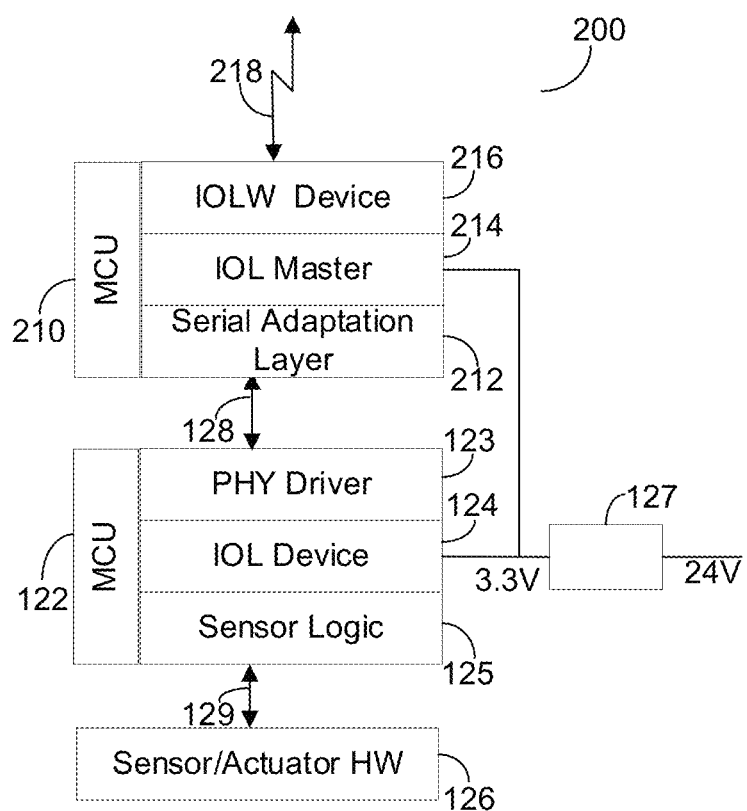
FIG. 2 is a block diagram of a mission critical industrial wireless communication networking circuitry according to an embodiment.

FIG. 2 depicts an example block diagram of a mission critical wireless communication link circuitry 200 according to an embodiment. In order to maintain investment in the MCU 122, the MCU 122 as well as its components of the PHY driver 123, the mission critical wireless communication link device 124 and the sensor/actuator logic 125 remain intact. To this end, the interface 129 to the sensor/actuator hardware 126, the PHY interface 128 also remains identical.

According to an embodiment, the PHY 121 is replaced which requires the use of a different component to achieve the mission critical wireless communication link capabilities as well as changes to the power supply structure. Accordingly, to the PHY interface 128, that remains operative under the same protocol conditions and structure as was the case in the mission critical wireless communication link used for a wired device, there is communicatively connected another MCU 210 which typically comprises components such as a processing element (PE) (not shown), a memory (not shown) and various other hardware devices as may be required for the performance of the tasks controlled by the MCU 122. Instructions stored in the memory of MCU 210 may be executed by the MCU 210 PE so as to perform the MCU 210 tasks described herein.

The MCU 210 further includes a serial adaptation layer 212 that adapts the traffic provided over the PHY interface 128 so as to comply with the interface of a wireless communication of the mission critical wireless communication link. This is necessitated due to the different nature of wired and wireless communication and in order to ensure proper communication. The MCU 210 may further comprise a mission critical wireless communication link master 214 that provides the interface to higher-level controller functions and controls the communication with the connected mission critical wireless communication link devices. A mission critical wireless communication link wireless device 216 provides for the necessary over-the-air communication, typically connected to an antenna (not shown) adapted for transmission/reception of wireless waves over which communication 218 is transmitted and received.

Power schema must change as power can no longer be provided from the wired communication line. Therefore, a power source, for example a 24 volt source, should be connected to a voltage converter 127, for example but not by way of limitation a DC2DC converter, that provides, for example, a 3.3 volt supply to components of the circuit 200 that so require. Some components, in some embodiments, for example, the sensor/actuator hardware circuit 126 may require direct supply from a 24V source which may be directly provided.

In an embodiment, rather than replacing the PHY 121 by MCU 210, the MCU 210 is added to the implementation of the wired mission critical wireless communication device. That is, the PHY interface is fed to both a PHY 121 as well as to a MCU 210, thereby providing a dual-communication mission critical wireless communication device, i.e., both wired and wireless mission critical communication links are provided.

The principles described herein may be used to handle a variety of mission critical industrial network communication, including but without limitation, the IO-Link protocol. It allows for quick, efficient and low-cost adaptation of a wired mission critical communication solution to a wireless mission critical communication solution.

Figure 3:
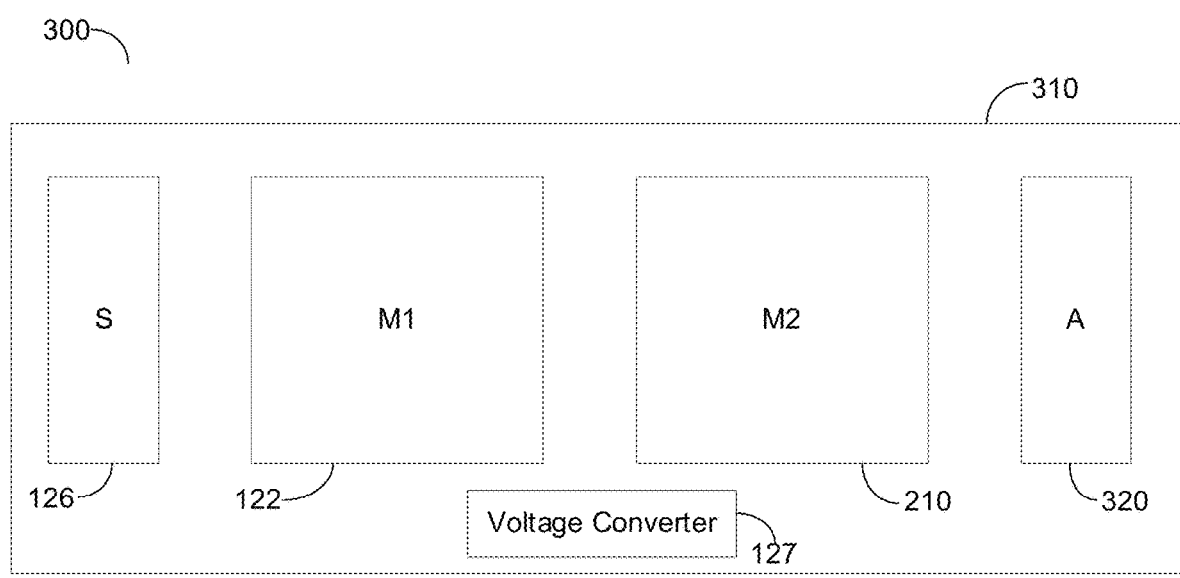
FIG. 3 is a module of a mission critical industrial wireless communication networking circuitry according to an embodiment.

FIG. 3 depicts an example module 300 of a mission critical industrial wireless communication device according to an embodiment. On to a substrate a sensor circuitry 126, a first MCU 122, a second MCU 210 and, a voltage converter 127 are mounted. These complements are communicatively connected as described with respect of FIG. 2. An antenna 310 is further mounted and communicatively connected to the second MCU 210 to allow for the transmission and reception of signals of the mission critical wireless communication link sensor. The antenna 310 receive and transmit signals in a frequency band defined by a protocol supported by mission critical wireless communication link. In an example embodiment, the frequency band is the industrial, scientific, and medical (ISM) band which is a group of radio frequencies (RF) that are internationally designated for use in the industrial, scientific, and medical fields. In one such band, the channels are spaced apart by 1 megahertz (MHz) and include the range from 2400-2480 MHz. Each channel may have one or more wireless transmitters transmitting over that channel. The functionality of a first MCU 122, a second MCU 210, and a voltage converter 127 are discussed above. While a sensor circuitry 126 is shown herein, this should not be viewed as limiting upon the solution and other circuits, for example but not by way of limitation, such as an actuator may be used.

Figure 4:
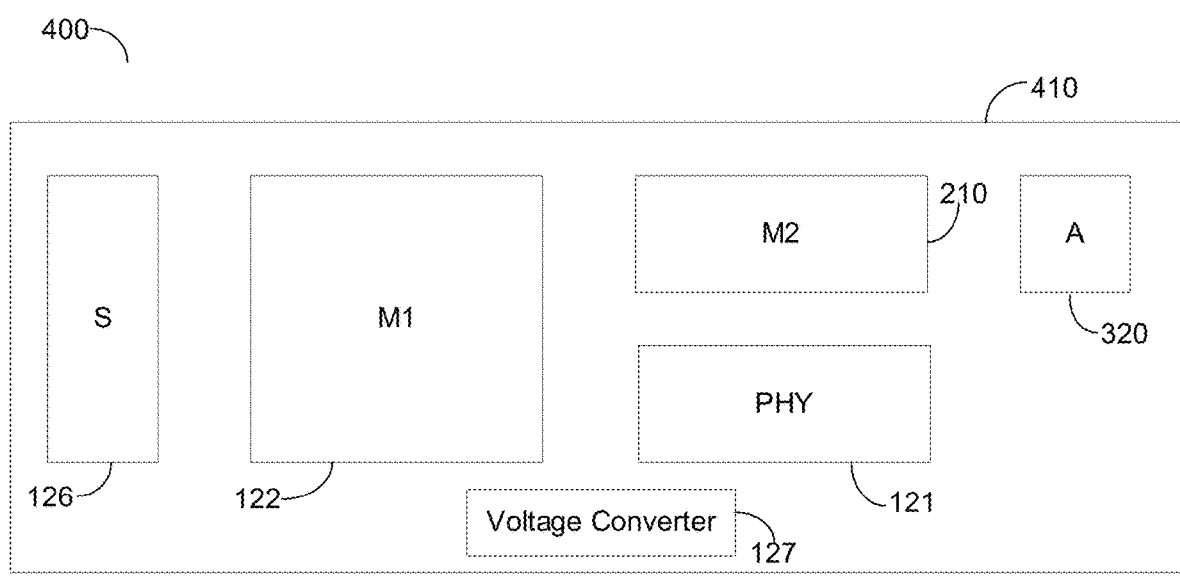
FIG. 4 is a module of a mission critical industrial dual-communication networking according to an embodiment.

FIG. 4 depicts an example module 400 of an industrial mission critical dual-communication device according to an embodiment. On to a substrate 310 a sensor circuitry 126, a first MCU 122, a second MCU 210, a PHY 121, and a voltage converter 127 are mounted. They are communicatively connected as described with respect of FIG. 2. An antenna 320 is further mounted and communicatively connected to the second MCU 210 to allow for the transmission and reception of signals of the wireless mission critical wireless communication device.

Figure 5:
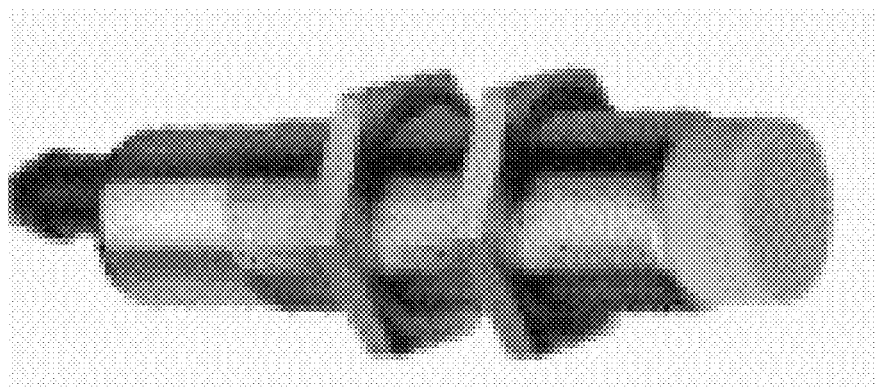
FIG. 5 is a body of an encasement for a mission critical industrial wireless communication networking device.

FIG. 5 is a picture of a body 500 of an encasement for an industrial mission critical wireless communication device. Modules such as the module 300 or the module 400, described in FIG. 3 and FIG. 4 respectively, may be fitted therein.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. An industrial mission critical wireless network communication device, comprising:
   a first microcontroller adapted to provide a physical layer communication according to a predetermined protocol, wherein the first microcontroller is communicatively connected to at least one of a sensor and an actuator;
   a second microcontroller communicatively connected to the first microcontroller using the physical layer communication protocol, the second microcontroller adapted with a serial adaptation layer to adapt communication of the physical layer to a wireless communication protocol, and being further adapted to control wireless communication according to a predetermined wireless communication protocol; and
   a power converter connected to the first microcontroller and the second microcontroller providing an operation voltage thereto that is lower than a voltage provided to the power converter, the voltage provided to the power converter not being supplied as part of a wired I/O-link;
   wherein the physical layer communication protocol is a wired I/O-Link protocol and the predetermined wireless communication protocol is a wireless I/O-Link protocol.

2. The device of claim 1, wherein the voltage provided to the power converter is 24 volts.

3. The device of claim 1, wherein the operation voltage provided by to the power converter is 3.3 volts.

4. The device of claim 1, wherein the first microcontroller is further adapted to control a sensor communicatively connected thereto.

5. The device of claim 1, wherein the first microcontroller is further adapted to control an actuator communicatively connected thereto.

6. The device of claim 1, wherein the first microcontroller is adapted to operate according to the wired I/O-Link protocol.

7. The device of claim 1, further comprising:
a physical layer component for wired communication, the physical layer component communicatively connected to the first microcontroller.

8. The device of claim 7, wherein the device is capable of performing both wireless and wired communication.

* * * * *